Feb. 14, 1961 R. R. STODDART 2,971,231
CABLE FASTENER
Filed Aug. 13, 1959

INVENTOR.
RICHARD R. STODDART
BY Harry R. Lubcke
AGENT

United States Patent Office 2,971,231
Patented Feb. 14, 1961

2,971,231
CABLE FASTENER

Richard R. Stoddart, Los Angeles, Calif., assignor to Stoddart Aircraft Radio Co., Inc., Los Angeles, Calif., a corporation of California Filed Aug. 13, 1959, Ser. No. 833,625

11 Claims. (Cl. 24—16)

My invention relates to means for fastening electrical cables or the like and particularly as these may be adjuncts to specific apparatus.

In substantially all electronic equipment of a portable nature one or more connecting cables are employed. These are invariably disconnected from the specific pieces of apparatus for transportation and must be stored in some manner with the apparatus. When this is accomplished in a haphazard manner the wear upon the cables is excessive and, consciously or unconsciously, the design of the equipment is regarded as inferior.

On the other hand, any cable fastener should be simple, easy to manipulate, versatile and relatively inexpensive.

I meet these requirements by providing a length of elastic material having holes throughout its length and a particular type of hook simply and permanently attached to one end of the elastic strip that is suited to secure more than one thickness of the strip material. This arrangement allows my fastener to be either normally attached to one end of the cable which it fastens, or for more than one turn to be taken around the convoluted cable when the same is fastened. Because of the elastic material of the strap the fastener can be attached under tension and so provide a secure means of holding the cable in a desirably rigid bundle by itself, or of attaching the cable to some part of the equipment for convenient stowage.

An object of my invention is to provide a versatile and effective fastener for cable or the like.

Another object is to provide a fastening for binding a convoluted cable with more than one turn of the fastening thereabout.

Another object is to provide a simple hook and a very simple hook-attaching configuration for a convoluted-cable fastener.

Another object is to provide a fastening that may be normally attached to one end of the cable it fastens, or which may be normally attached to a surface to which the cable is to be attached.

Another object is to provide a fastening for convoluted cable-like elements that is inexpensive and easy to manufacture.

Other objects will become apparent upon reading the following detailed specification and upon examining the accompanying drawings, in which are set forth by way of illustration and example certain embodiments of my invention.

Figure 1:
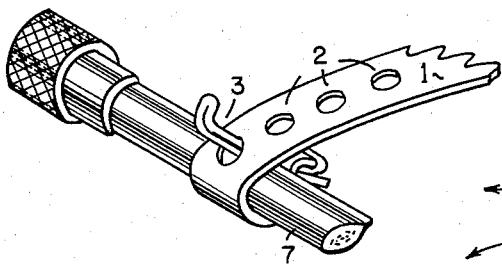
Fig. 1 shows my cable fastener in relation to a single cable end.

In Fig. 1 numeral 1 indicates the strip of flexible and elastic material that forms the strap of my fastener. This is preferably fabricated of a good grade of rubber or of an equivalent rubber-like plastic. The elasticity desired is about midway between the well-known rubber band and a strip of leather; in other words, neither fully elastic nor non-elastic. The strap may be of any size, but for usual electronic equipment cables I have found that a width of between one-half and one inch and a thickness of one-sixteenth inch to be preferable. A suitable material is known to the trade as smooth finished neoprene, hardness 50–60.

A number of holes 2 are punched in the strap, preferably evenly spaced and throughout the length thereof. These may be about one-eighth inch diameter and spaced a half inch. The holes allow the strap to be fastened on hook 3.

Figure 4:
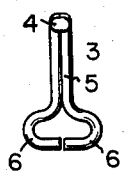
Fig. 4 shows a front view of the hook only of my fastener.
Figure 5:
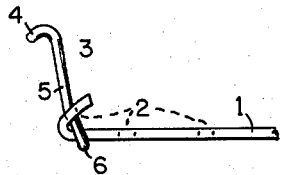
Fig. 5 shows how the hook and flexible strap of my fastener are linked together.

Hook 3 is more fully shown in Fig. 4. It is formed of a single piece of stiff wire having a diameter in excess of one-sixteenth inch. It is sufficiently strong so that under all conditions of use it does not suffer deformation. As shown in both Figs. 4 and 5, two thicknesses of wire form a rounded nose 4 at the top. This is the ultimate securing means for the several thicknesses of the strap when the fastener is in use.

The two wire sides lie side by side below the nose in an elongated shank 5. The shank is longer than would normally be provided on a hook. This is so that several thicknesses of strap may be impaled upon the shank in the manner in which my fastener functions.

At the bottom of the hook each end of the wire is formed into a flat transverse loop 6 sufficiently wide to hold one end of the strap. The hook is attached to the strap by sliding this loop along the strap until the nose of the hook can be pushed through the last hole in the strap. This is accomplished by deforming the strap and the hook then pushed through the hole until the turned-back end of the strap is nested down at the wire loop. It will be noted from Fig. 5 that the loop 6 has a cant with respect to the axis of the shank. This construction causes the attachment of the hook to the strap to be secure and separable only by deliberate manual manipulation of the two elements when the cable fastener is not in use. The angle of the cant is less than one radian (57.3 degrees) and may be considerably less, as shown. It will be recognized that this is a very simple and effective manner of attaching a hook to a strap.

Aluminum, brass or so-called "iron wire" are suitable materials for fabricating the hook. With the last material the hook is plated, as with cadmium, to prevent corrosion.

Figure 2:
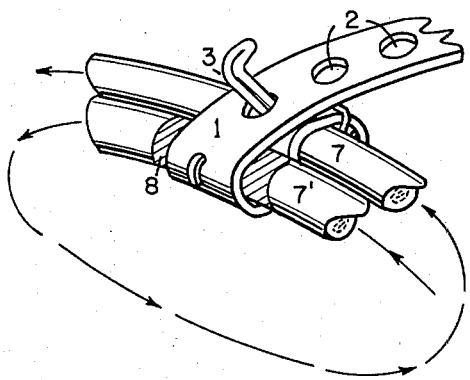
Fig. 2 shows the fastener in relation to two convolutions of a cable.

I prefer to accomplish the fastening operation of a cable 7 in the following manner. My fastening is first secured around the cable at one end, as shown in Fig. 1. In fact, it may be retained there while the cable is unwound and is in use with the equipment. In order that cable 7 be convoluted in a turn of predetermined diameter, a marker band 8 is provided on the first full convolution 7', as shown in Fig. 2. My cable connector strap 1 is given a second turn, around both convolutions 7 and 7' this time, and particularly by stretching the strap slightly the cable coil is initiated conveniently and firmly.

Figure 3:
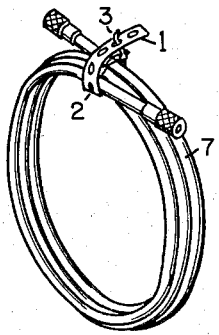
Fig. 3 shows a complete length of cable fastened.

As shown in Fig. 3, the convoluting of the cable is continued to completion and a third turn of strap 1 is taken around all of the cable turns. In making each of the turns around the cable with the strap a slight tension is recommended and the hook is placed through the particular hole which retains the tension. This forms a firm bundle so that only one of my cable fasteners per cable is sufficient for many purposes.

However, for some purposes a second fastener may be added when the fastening by the first has been completed. This is accomplished in Fig. 3, for instance, by merely wrapping the second fastener opposite to the one shown; i.e., at the bottom of the cable coil. This may be a single turn about the convoluted cable, but I prefer to wrap the strap of the fastener around twice in order to obtain a tighter fastening. Each turn is secured by passing a hole 2 through the hook.

Figure 6:
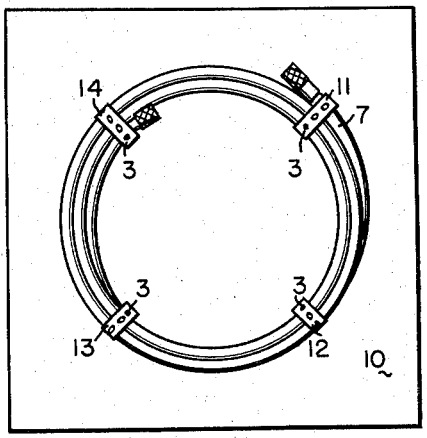
Fig. 6 shows a plurality of my cable fasteners attached to a surface and a cable fastened thereby.

Multiple fastening of a given cable is illustrated in the important alternate of Fig. 6. Here element 10 is a surface, or board; usually taking the form of the top or other cover for the associated equipment. In this instance cable 7 is held by four fasteners; 11, 12, 13, 14. These fasteners are each held to surface 10 by a screw and washer passing through one of the holes 2 near to the hook 3 in each case, say the third hole. While these screws cannot be seen in Fig. 6 because cable 7 overlies them this simple form of attachment will be fully understood from the above description. In this case, a single turn of the straps around the convoluted cable is most convenient, but other alternates derived from the above teaching may be employed. It is understood that cable 7 in Fig. 6 may have more than the three convolutions apparent. Other turns lie below those seen.

The length of the strap in each connector is normally made a few holes longer than the length required for the intended cable. Considering the fact that multiple turns around the cable are usually desired this causes the length to lie in the range between six and twelve inches. A surplus length does not interfere with the fastening function and may be desirable for fastening the convoluted cable to a peg on the wall or otherwise. For this arrangement one more turn of the strap free of the cable and secured under the hook provides a generous loop to engage the peg. With attachment to a surface as shown in Fig. 6 an excess length of straps is not desirable beyond about two or three holes to avoid loose ends.

It will be understood that the embodiment of Fig. 6 may employ three fasteners instead of the four shown, or perhaps more than four should the cable be heavy, as with a lead sheath.

The electronic cables mentioned will be recognized as widely used in the art and as usually consisting of a number of copper wires within an outer sheath of rubber or plastic. However, the "cable" fastened with my fasteners may be a number of turns of a single wire, an acoustic tubing, other long flexible elements, coaxial cables having either spaced "air" insulation or solid insulation, and also flexible waveguide of relatively small cross-section.

Other departures may be taken from the embodiments given without passing beyond the scope of my invention; such as forming hooks 3 out of a single piece of metal by stamping or casting. The off-set loop 6 should still be provided by subsequent bending or suitable casting and sharp corners must be removed.

Still further modifications may be made in the size, shape, proportions and arrangement of the illustrated embodiments without departing from my invention.

Having thus fully described my invention and the manner in which it is to be practiced, I claim:

1. Means for securing plural convolutions of cable or the like comprising one flexible strap having a number of holes along its length, said strap having an open-ended hook clamped thereto only by insertion through a hole in one end of said strap, said hook having a long shank and a transverse loop only sufficiently large to surround said strap, the shank of said hook being sufficiently long to receive plural thicknesses of said strap, and the open end of said hook suited to secure plural turns of said strap around at least some of the convolutions of the cable or the like.

2. Means for securing multiple convolutions of electric cable comprising an elastic strap having a number of holes along its length, said strap having a hook with a gradually curved nose self-clamped through a hole in one end of said strap, said hook having a long shank and a loop lying at an angle of less than one radian to said shank closely surrounding said one end of said strap, the shank of said hook being sufficiently long to contain plural thicknesses of said strap when passed through the holes therein to provide, and said gradually curved nose to retain, more than one turn of said strap around at least some of the convolutions of said cable.

3. Means for binding at least two turns of a long flexible element at plural locations therearound comprising a plurality of straps, each having holes along its length, a hook having a body, each said hook formed of metal and passing through a hole in one end of one said strap, with a narrow loop upon said strap exclusively for attachment thereto, said body of each said hook being sufficiently long to allow said strap to be bound around said element at least once and fastened upon said hook body, one thickness of said strap atop another, through selected said holes along the length of said strap.

4. Means for binding plural convolutions of cable or the like at plural locations around said convolutions comprising a plurality of flexible strips each having a number of holes along its length, a hook for each said strip having a central body and an open hook end, each said hook formed of a single length of wire doubled through a hole in one end of said strip and having a loop clamped around said strip for attachment, said body of each said hook being sufficiently long to allow each said strip to be bound around said cable or the like plural times and fastened under tension in alignment upon said body under said open hook end through selected said holes along the length of said strip.

5. Means for binding multiple convolutions of flexible electric cable at plural locations around said convolutions comprising a plurality of elastic straps, each having a number of holes along its length, a hook having a long central body and an outwardly extending hook end for each strap, each said hook formed of a single length of metal wire doubled through a hole in one end of one said strap and having a bottom loop clamped transversely upon only one thickness of said strap for attachment thereto, said body of each said hook being sufficiently long to allow said strap to be bound around said cable plural times one turn atop another and repeatedly fastened under tension upon said hook body through selected said holes along the length of said strap.

6. A fastening for securing convolutions of a long flexible element comprising a strap having holes therein, a hook, said hook formed of a single piece of metal, with the hook end curved through approximately a right angle, said hook passing through one of said holes and having a loop around only a single thickness of said strap, the shank of said hook being sufficiently long to accommodate plural thicknesses of said strap for plural turns of said strap around at least some of the convolutions of said element.

7. A fastening for binding plural convolutions of cable or the like comprising a strip having holes along its length, a hook having a shank and a free end disposed at approximately a right angle to said shank, said hook formed of wire doubled through a hole in one end of said strip and having a bottom loop of a cross-section sufficient for only one thickness of said strip to pass therethrough said loop lying at an angle to the axis of and exterior to said shank to secure said hook to said strip, the shank of said hook being sufficiently long to accommodate plural thicknesses of said strip for more than one turn of said strip around at least some of the convolutions of said cable.

8. An elastic fastening for binding multiple convolutions of a flexible cable for electronic equipment comprising an elastic strap having a number of holes uniformly spaced along its length, a hook having a long shank, said hook formed of a single piece of wire doubled through a hole in one end of said strap and having a bottom loop, the plane of said loop lying at an angle of less than one radian to the axis of said shank to clamp said hook to a single thickness of said strap, the shank of said hook being sufficiently long to accomplish fastening of plural thicknesses of said strap to accommodate more than one turn of said strap around at least some of the convolutions of said cable and said hook shaped outward to retain said plural thicknesses of said strap.

9. Means for securing plural convolutions of a cable-like element comprising a surface, plural straps each having holes along the length thereof, a hook doubled through a hole in one end of one thickness of each said strap, means to fasten each of said straps to said surface in radial relation, the convolutions of said element surrounded by plural passes of each said strap therearound and secured one atop the other by said hook passing through at least one of said holes in said strap in each of said plural passes.

10. Means for securing multiple convolutions of flexible cable comprising a planar instrument cover, at least three elastic straps each having a number of holes equally spaced along the length thereof, a hook having a long body, an open hook end, and, doubled through a hole in one end of only one thickness of each of said straps, single means to fasten each of said straps to said cover in a radial relation, with said hooks at the smaller radius, the convolutions of said cable surrounded by at least one pass of each said strap therearound and secured by said hook body passing through at least one of said holes in said strap in each instance.

11. Means for securing at least one turn of a long flexible element comprising a rigid member having a surface, at least two flexible straps, each of said straps having holes along its length, a hook for each of said straps, each said hook having a body and a loop, the body of a said hook disposed in one hole at the end of each said strap, and the loop of a said hook surrounding only one thickness of one said strap, means to fasten each of said straps to said member upon said surface at one point, the turn of said element surrounded by at least one pass of each said strap therearound and secured by the body of said hook passing through at least one of said holes in said strap.

References Cited in the file of this patent

UNITED STATES PATENTS

| | | |
|---|---|---|
| 1,009,633 | Bascom | Nov. 21, 1911 |
| 2,107,421 | Lennox | Feb. 8, 1938 |
| 2,759,390 | Edwards | Aug. 21, 1956 |

FOREIGN PATENTS

| | | |
|---|---|---|
| 37,795 | Austria | June 25, 1909 |
| 259,578 | Switzerland | June 16, 1949 |